United States Patent [19]

Schlesinger

[11] 3,710,176

[45] Jan. 9, 1973

[54] ELECTRON-OPTICAL RECORDING DEVICE

[75] Inventor: Kurt Schlesinger, Fayetteville, N.Y.

[73] Assignee: General Electric Co.

[22] Filed: May 11, 1970

[21] Appl. No.: 36,098

[52] U.S. Cl. ....................315/31 R, 178/5.4

[51] Int. Cl. ....................H01j 29/56

[58] Field of Search ........315/10, 30, 31 TV; 313/80, 313/79, 83; 178/5.4

[56] References Cited

UNITED STATES PATENTS

| | | | |
|---|---|---|---|
| 2,806,899 | 9/1957 | Zworykin | 178/5.4 |
| 3,160,782 | 12/1964 | Rich | 315/30 X |
| 3,134,044 | 5/1964 | Auvil | 315/31 TV |
| 3,491,236 | 1/1970 | Newberry | 313/80 |

OTHER PUBLICATIONS

"Internal Electrostatic Deflection Yahes," Electronics, Vol. 25 July pp. pp 105–109.

*Primary Examiner*—Carl D. Quarforth
*Assistant Examiner*—J. M. Potenza
*Attorney*—Nathan J. Cornfeld, John P. Taylor, Frank L. Neuhauser, Oscar B. Waddell and Joseph B. Forman

[57] ABSTRACT

An electron-optical recording device is provided comprising two cascaded image-forming stages. In the first stage an electron beam is magnetically focused and electrostatically deflected to a preselected aperture in a multi-aperture plate separating the first stage from the second stage. The beam emerging from one of the apertures is focused and deflected in the second stage onto a target. Error correcting means are provided in both stages to maintain proper alignment of the electron beam.

10 Claims, 7 Drawing Figures

INVENTOR:
KURT SCHLESINGER,
BY John F. Taylor
HIS ATTORNEY.

INVENTOR:
KURT SCHLESINGER,
BY John P. Taylor
HIS ATTORNEY.

INVENTOR:
KURT SCHLESINGER,
BY John F. Taylor
HIS ATTORNEY.

ELECTRON-OPTICAL RECORDING DEVICE

BACKGROUND OF THE INVENTION

This invention relates to electron beam apparatus and more particularly to the precise control of a scanning electron beam by two cascaded image-forming stages.

Precise control of an electron beam for use, for example, in a computer memory or in the manufacture of integrated circuits has been previously achieved using an array of electrostatic lenslets each having its own deflection electrodes. A coarse beam is deflected to one of the lenslets and this coarse beam is then focused by the lenslet and deflected to precision scan a small area adjacent this lenslet. Such a system is described and claimed in U.S. Pat. No. 3,491,236 – Newberry, issued Jan. 20, 1970, and assigned to the assignee of this invention.

The construction of such an array of electrostatic lenslets comprising three metal plates each having an array of tiny and precisely spaced openings which must be aligned with corresponding openings in the adjacent plates to form an array of Einzel lenses is not simple. Additional complications arise in constructing a deflection electrode matrix to provide X and Y deflection for each lenslet.

SUMMARY OF THE INVENTION

It is therefore an object of this invention to provide a two stage electron optical recording device wherein an electron beam is controlled by deflection in two stages wherein the second stage comprises electron optics capable of deflecting the electron beam independently regardless of the particular address of the electron beam received from the first stage.

It is another object of the invention to provide a two stage electron optical recording device wherein an electron beam is focused by magnetic means common to both stages.

It is a further object of the invention to provide a two stage electron optical recording device having a first stage of electron optics comorising a combination of magnetic focus and electrostatic deflection designed to insure orthogonal landing of an electron beam on an array of apertures comprising first address positions.

It is yet another object of the invention to provide correctional means to lock the beam in the first stage stabilizing it on center at each aperture.

It is a further object of the invention to provide identical deflection in the second stage to sweep all secondary electron beams alike regardless of the address selected in the first stage.

It is another object of the invention to provide correctional means in the second stage to stabilize the scan of the electron beam in the second stage.

These and other objects of the invention will be better understood by reference to the following description read in conjunction with the accompanying drawings.

DESCRIPTION OF THE PREFERRED EMBODIMENTS

Figures 1, 3, 4:
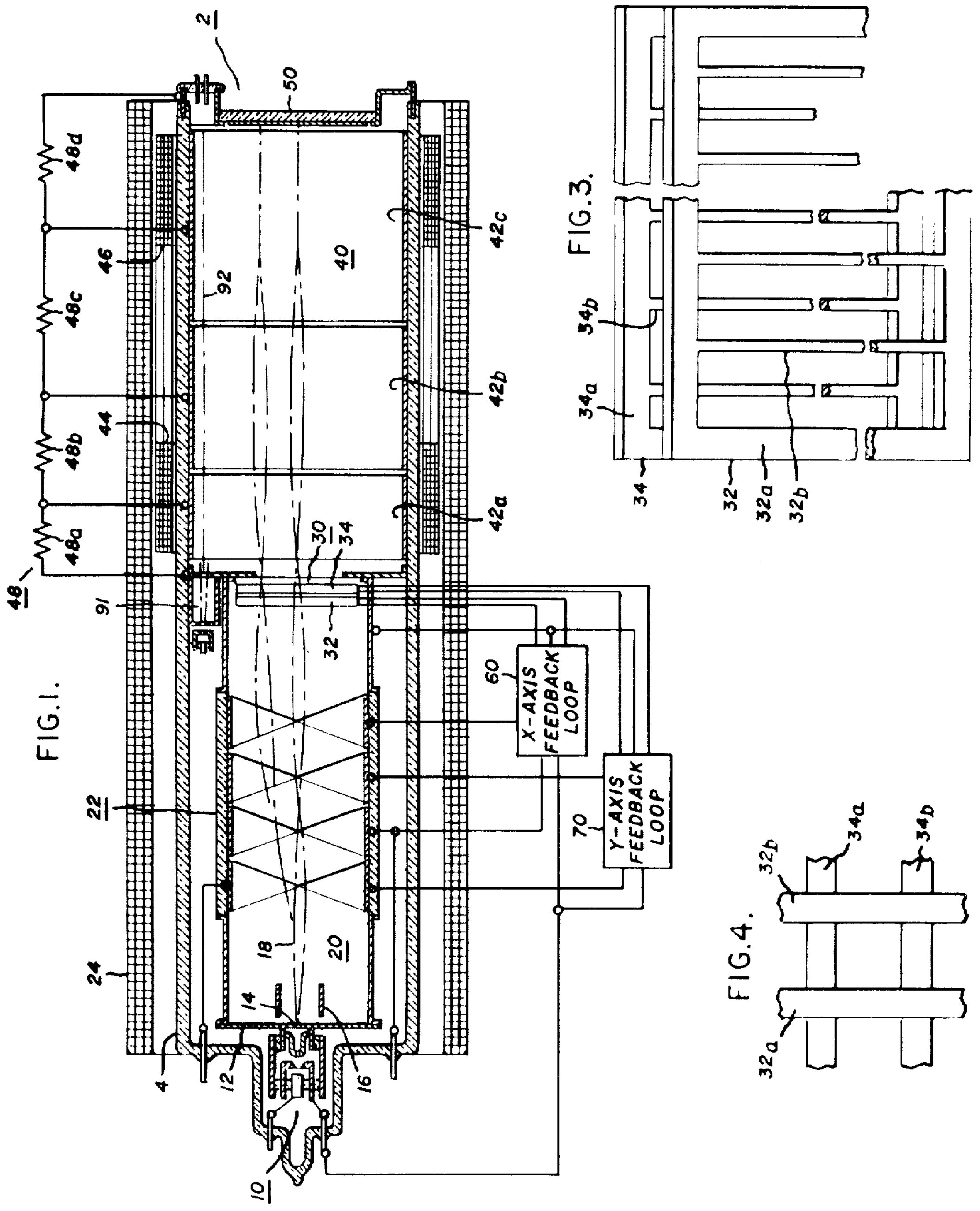
FIG. 1 is a cross-sectional view of the invention.
FIG. 3 is a sketch of a portion of the invention illustrated in FIG. 1.
FIG. 4 is an enlarged fragmentary cross-section of a portion of FIG. 1 taken along lines IV—IV.

Referring now to FIG. 1, an electron-optical recording device is shown at 2 generally comprising an evacuated glass cylinder 4 having electron beam generating means 10 at one end thereof and target means 50 at the opposite end which, in the illustrated embodiment, is a phosphor screen. A first address section or stage 20 directs the electron beam 18 emanating from beam generating means 10 to a perforated anode or code plate 30 located midway between beam generating means 10 and target 50. A second address section 40, controls the electron beam emerging from the particular opening in anode 30 as it travels to target 50. An external lens system (not shown) can be used to focus light, onto target 50 from, for example, light shining through punched holes in a cord display.

Beam source 10 comprises a high intensity Pierce gun such as the gun described and claimed in U.S. Pat. No. 3,436,583 – Hughes, issued Apr. 1, 1969 and assigned to the assignee of this invention. A 1,000 volt low divergency beam is emitted by beam source 10 through a very small spot-defining aperture 14 in aperture plate 12 into first address section 20.

Electron beam 18 is focused in section 20 by focus coil 24 which provides a uniform focus-field for both the first and second address sections. The length of section 20 is twice the nodal length of beam 18 thereby providing sharp focus permitting fine control of collimation of beam 18 at plate 30. Beam 18 is deflected in both the X and Y axes by an electrostatic deflection yoke 22 measuring one nodal length and coaxially positioned midway in section 20.

To insure the landing of beam 18 in sharp focus at a particular aperture in plate 30, a fine focus adjustment electrode 16 is provided adjacent beam generating means 10. By adjusting the potential on electrode 16, the effective focal point at beam generating means 10 can be moved along the axis of device 2. Such that twice the nodal length of beam 18 from this adjusted focus point equals the distance to the particular aperture in plate 30.

Electrostatic deflection yoke 22 comprises two pair of interleaved electrodes on the inside of an insulated cylinder. As explained more fully in my publications "Internal Electrostatic Deflection Yokes," ELECTRONICS, Volume 25, pp 105–109 July 1952; and "-Progress in the Development of Post Acceleration and Electrostatic Deflection," PROCEEDINGS OF THE IRE, Volume 44, pp 659–667 May 1956, the use of interleaved electrodes which generally longitudinally extend in zig-zag fashion circumferentially about a tubular form, to about 225°–270°, provides an electrostatic deflection field equivalent to the simultaneous placement on the envelope perimeter of a parallel pair of X-axis electrodes and a pair of Y-axis electrodes, but without the field distortion which would otherwise occur if non-interleaved electrodes were used.

In the embodiment illustrated, for example, a field of 65 gauss provided by focus coil 60 which surround a 4 ½ inches diameter glass envelope provides a nodal length of 4 inches for beam 18. In this example, first address section is 8 inches in length with electrostatic deflection yoke 22, measuring about 4 inches in length and about 2 ½ inches in diameter, coaxially placed midway between aperture plate 12 and code plate 30.

The electrostatic focus electrode 16 permits fine adjustment of landing all across plate 30. Code comprising or anode 30 comprises an electrode having a matrix of equally spaced apertures therein. For example, in the illustrated embodiment 1,024 holes are provided, spaced in 32 rows of 32 holes each. Deflection yoke 22 in cooperation with focus coil 60 deflects and focuses beam 18 to normal landing in the center of a preselected area defined by a center hole or aperture in code plate 30.

Figure 2:
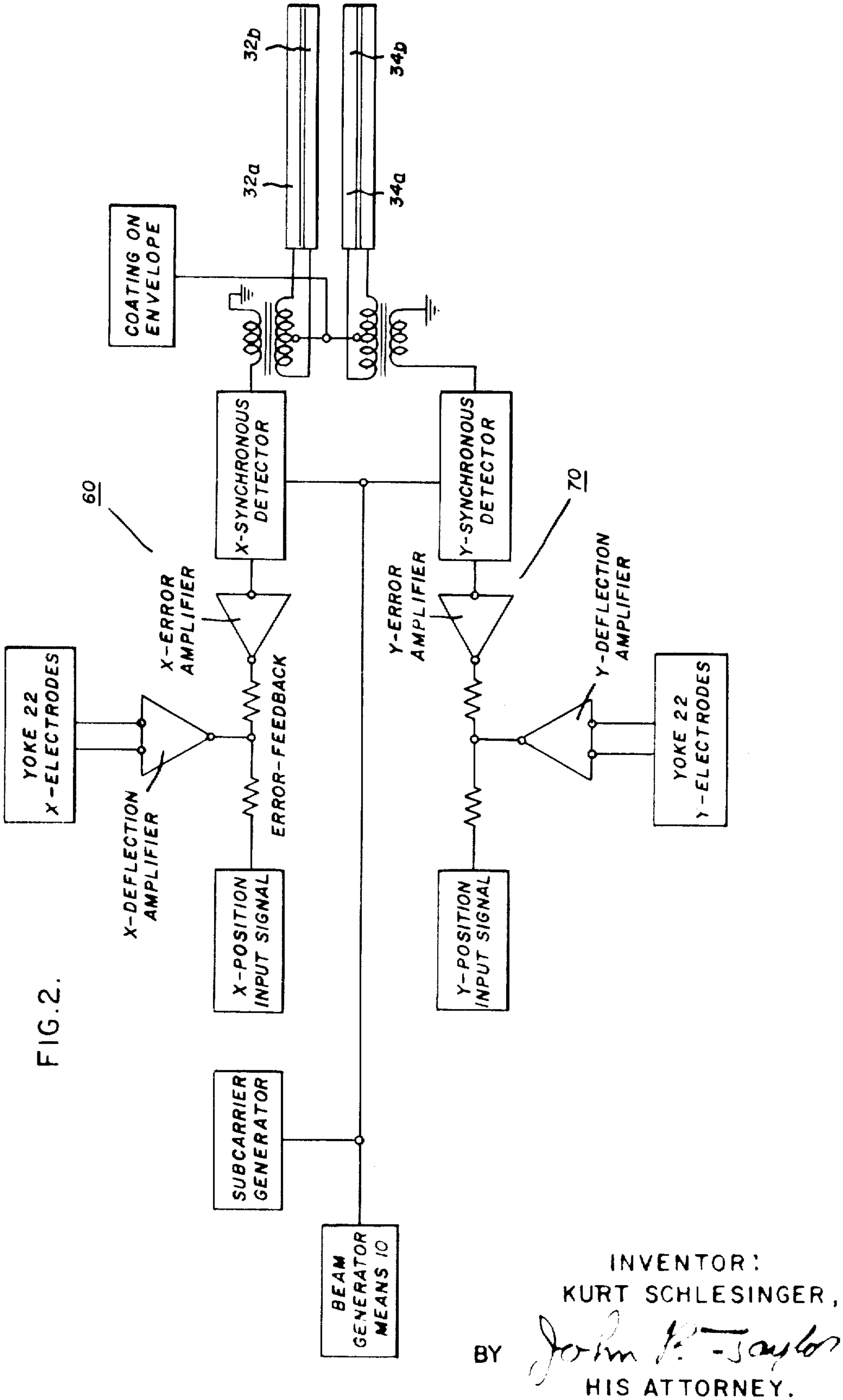
FIG. 2 is a schematic view of a portion of FIG. 1.

To insure that beam 18 will come to rest only in a matrix of stable positions or fields defined by the apertures in code plate 30, X-axis and Y-axis error-correcting feedback loops 60 and 70 are provided for Section 20 as best seen in FIGS. 1 and 2.

This loop comprises two pairs of crossed, and electrically balanced beam guides 32 and 34 which as seen in FIG. 4, form a grid of windows in registry with the apertures in code plate 30. These plates pickup error-correcting signals to be fed back to deflection yoke 20 to insure preferred landing of the beam in the center of each field on the code plate.

Figure 5:
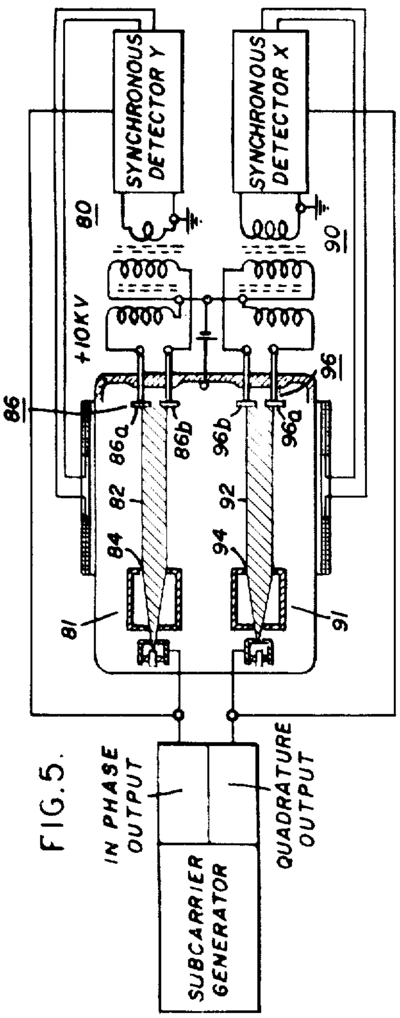
FIG. 5 is a schematic view of a portion of the invention.

In the embodiment illustrated, beam guide 32, as best seen in FIG. 3, comprises two metal plates 32*a* and 32*b* each having, for example, 16 bars of about 16 mils width with cutaway portions of about 94 mils therebetween. Plates 32*a* and 32*b* are mounted back to back in electrically insulated relationship with the bars interleaved to form 32 rectangular windows as partially shown in FIG. 3 thus presenting to the beam 32 windows for passage. Similarly, beam guide 34 comprises two metal plates 34*a* and 34*b* formed identically to plates 32*a* and 32*b*. Beam guide 34 is mounted parallel to beam guide 32 with the bars of guide 34 rotated 90° with respect to the bars of guide 32 to form the lattice as illustrated in FIG. 5. When beam 18 is off-center an unequal interception of beam current in one or both of the pairs of beam guides generates error signals through the feedback loops to deflection yoke 20 to correct the X or Y axis error and drive the beam back to the center line of the particular aperture in code plate 30.

Turning now to the second address section 40 in FIG. 1, beam 18 emerging from one of the small apertures in code plate 30, e.g. 0.7 mils, is accelerated, for example, from 1 KV to 10 KV or more by a uniform, axial electrostatic field, established by a series of rings 42*a*, 42*b*, and 42*c* comprising cylindrical electrodes of progressively increasing length which are coaxially spaced apart in envelope 4 between code plate 30 and target 50. Alternatively rings 42*a*, 42*b*, and 42*c* can be replaced by a resistive spiral coating on the inside of envelope 4.

An electromagnetic deflection yoke 44 surrounding rings 42*a*, 42*b*, and 42*c* establishes a very uniform transverse-magnetic field in Section 40, permitting identical scanning for any of the 1,024 elemental rasters in the total memory area on target 50.

Surrounding yoke 44 is an error-correcting electromagnetic yoke 46. Yoke 46 receives error-correcting signals from second-address X-axis and Y-axis feedback loops 80 and 90 as shown schematically in FIG. 5 by error feedback circuit.

Figure 6:
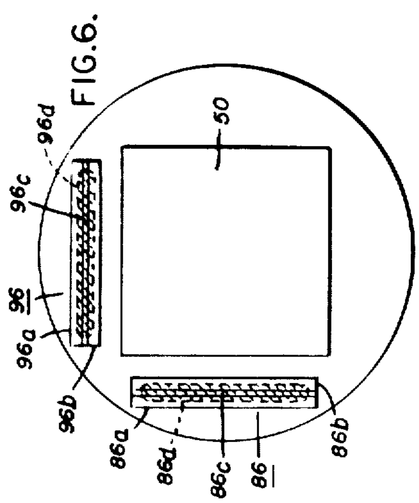
FIG. 6 is an end section view of FIG. 1.

Error-correcting signals are fed respectively to either X-axis feedback loop 80 or Y-axis feedback loop 90 by two sheet beams 82 and 92 generated by triode guns 81 and 91, one of which is also shown in FIG. 1. Beams 82 and 92 respectively illuminate rectangular areas 86*d* and 96*d* on targets 86 and 96. As best seen in FIG. 6, targets 86 and 96 each comprise two long narrow electrodes 86*a*, 86*b*, and 96*a*, 96*b* with an insulat-ing slit 86*c* and 96*c* between them. Target 86 is rotated 90° to target 96, e.g. beam 82 then is passing through a rectangular window 84 terminating gun barrel 81. A sharp electron image of beam shaping window 84 is focused into the plane of the interceptor electrodes 86*a* and 86*b* by external focus coil 24 which is common to the whole tube. Any shifting of beam 82 normal to electrodes 86*a* and 86*b* generates an error-signal in the tuned transformer 87 connected to electrodes 86*a* and 86*b*. Any movement in line with the slit 86*c* is ignored by the feedback loop. In this way, gun 81 and its ancillary collectors, 86*a* and 86*b*, respond to accidental beam deflection in the X-direction, and the same holds for gun 91 and its circuitry including electrodes 96*a* and 96*b* for the Y-direction. Feedback loop circuits 80 and 90 shown in FIG. 3 utilizes a system of subcarrier-diplexing similar to circuitry well known to those skilled in the art of detection of chromaticity signals in Color Television. As seen in FIG. 3, pilot guns 81 and 91 are grid-modulated by a common carrier frequency of about 10 megahertz with the X and Y signals on the respective guns 90° out-of-phase with respect to one another. This makes it possible to tune the primaries of the RF transformers coupled to the respective dipoles 86*a*, 86*b*, and 96*a*, 96*b* of targets 86 and 96 to the frequency of the subcarrier. This results in a high signal output from each of the targets, while, at the same time, insuring a clean separation of the X-axis signal from the Y-axis signal by virtue of the 90° phase difference. The two error-correcting signals are then fed back as shown in FIG. 5 to the error-correcting electromagnetic yoke 46 which is provided with two crossed field windings as best seen in FIG. 5.

Thus, pilot beams 82 and 92 correct slow drift of the scanning patterns in Section 40 as induced accidentally by extraneous fields, variation of anode voltages, and other perturbations.

It should be noted here that the transverse magnetic field established in Section 40 by magnetic deflection yoke 44 traverses the pilot beam region as well. Parasitic signals may therefore be created which interfere with the generation of position error signals unless the feedback loop shown in FIG. 5 is keyed to operate only during retrace times, i.e., at zero passage of current in yoke 44. This problem can alternatively be overcome by the embodiment illustrated in FIG. 7.

Figure 7:
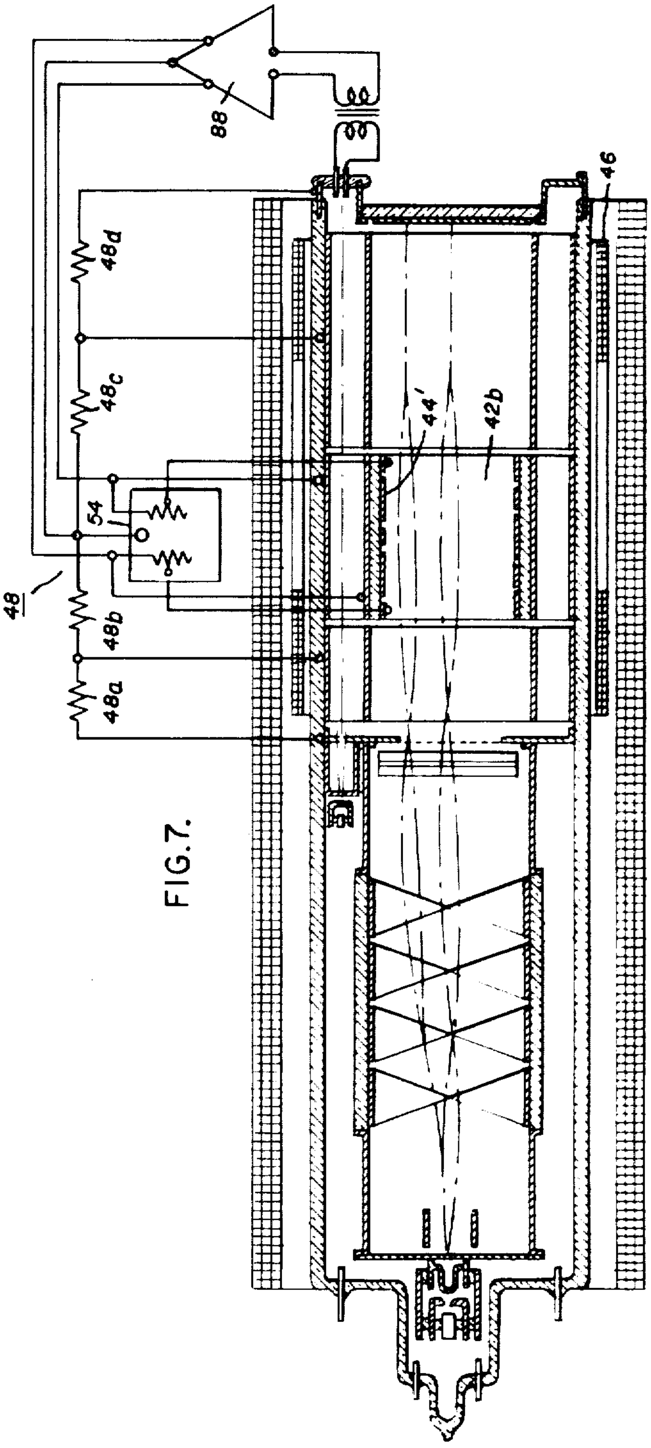
FIG. 7 is a cross-sectional view of another embodiment of the invention.

In this embodiment, electromagnetic yoke 44 is replaced by an electrostatic yoke 44' of smaller diameter comprising two pair of interleaved electrodes similar to the configuration previously discussed with respect to yoke 22. Yoke 44' preferably comprises a glass cylinder having the conductive electrode pattern on its inner surface. The outer surface is provided with a continuous conductive coating such as aluminum to provide a shield. Main beam 18 travels through yoke 44' and is deflected thereby. Pilot beams 82 and 92, however, do not pass through yoke 44' and are electrically shielded from the scanning field of yoke 44' by the outer conductive coating on yoke 44'. The potential of the coating on yoke 44', as well as the average potential of the electrodes on yoke 44', are maintained at the potential of ring **42*b*. Thus, only about 250 volts per terminal are required under these conditions to achieve a 50 mil scan-width on the screen. In this embodiment, current flowing, for example, from dipole 86*a* or 86*b* is fed through X-axis error-signal generator 88 to X-scan generator and thence to the X-axis electrodes on yoke 44'. A second, similar, loop (not shown) is provided to feed error-correcting signals from dipoles 96*a* or 96*b* to the Y-axis electrodes on yoke 44'. The bleeder circuit 48, comprising resistors 48*a*, 48*b*, 48*c*, and 48*d*, which is used in the embodiments shown in both FIGS. 1 and 7 to bias cylindrical electrodes 42*a*, 42*b*, and 42*c* is also illustrated in FIG. 7. The interconnection of the error-correcting loop to the potential on electrode 42*b*** is thereby shown.

Thus, pilot beams 82 and 92 are still exposed to the focus fields in Section 40 and are also effected by any extraneous therein. Therefore, the electrical conditions which might cause a drift of the scanning pattern of beam 18 in address Section 40 will also effect beams 82 or 92 causing error-correcting signals to be generated as described earlier.

In yet another embodiment (not shown) yoke 44 can be replaced by an array of electrostatic deflection electrodes such as illustrated in FIGS. 4 and 5 of the aforesaid Newberry patent (U.S. Pat. No. 3,491,236) cross-reference to which is hereby made. Briefly such an array comprises a first set of parallel and equally spaced apart electrodes to deflect the beam, for example, in the X-axis and adjacent to the first set of electrodes, a second set of parallel and equally spaced apart electrodes orthogonal to the first set to deflect the beam, for example, in the Y-axis. The adjacent electrodes in each set are then supplied with the respective deflection voltages, e.g. +X, −X for one set, +Y, −Y for the other set. This array is mounted midway in second address 40, that is, about the midpoint of middle cylindrical electrode **42*b*. As in the embodiment utilizing electrostatic yoke 44', in this embodiment pilot beams 82 and 92 are exposed to the focus fields in address Section 40** but are not deflected by the deflection array.

Thus, my invention provides a two-stage precise control of an electron beam with error-correcting means in each stage to insure correct and precise landing of an electron beam on a given segment of a target which may comprise a memory. While specific hardware and circuitry have been illustrated, minor modifications will be readily apparent to those skilled in the art and are deemed to be within the scope of the invention as defined in the appended claims.

What I claim as new and desire to secure by Letters Patent of the United States is:

1. A two-stage electron optical device for precision control of an electron beam comprising:

a. an evacuated envelope b. electron beam source means within said envelope, c. target means within said envelope spaced apart from said beam source means, d. first electron-optics means adjacent said beam source means including: (1) a perforated anode positioned between said beam source means and said target means, (2) deflection means to deflect an electron beam from said beam source means to a preselected perforation in said anode, and (3) focus means for bringing said beam to a sharp focus at the center of said preselected perforation, and e. second electron-optics means between said perforated anode and said target including: (1) second deflection means for deflecting a beam from any one of said perforations to a preselected portion of said target means, and (2) common focus means for bringing said deflected beam to a sharp focus at said target.

2. The electron optical device of claim 1 wherein said first electron-optics means includes correctional means to control the alignment of said beam with the center of said perforations.

3. The electron-optical device of claim 1 wherein said second electron-optics means includes correctional means to stabilize the scan of the beam from said perforated anode to said target.

4. The electron-optical device of claim 1 wherein said focus means in said first electron-optics means includes a magnetic coil.

5. The electron-optical device of claim 1 wherein said focus means in said second electron-optics means includes a magnetic coil.

6. The electron-optical device of claim 1 wherein said focus means in said first electron-optics means and said focus means in said second electron-optics means comprise a common magnetic coil.

7. The electron-optical device of claim 1 wherein the deflection means in said first electron-optics means comprises an electrostatic yoke having interleaved electrodes thereon for simultaneous X and Y axes deflection.

8. The electron-optical device of claim 3 wherein said second electron-optics means includes an electrostatic deflection yoke coaxially positioned in said envelope between said perforated anode and said target, said yoke having interleaved electrodes thereon for simultaneous S and Y axes deflection and said correctional means include auxiliary electron beam means positioned adjacent said perforated anode sufficiently eccentric with respect to said deflection yoke so that beams from said auxiliary beam source means do not enter said yoke.

9. The electron-optical device of claim 3 wherein said second electron-optics means includes an array of electrostatic deflection electrodes comprising a plurality of parallel and equally spaced apart electrodes for X-axis deflection and an adjacent plurality of parallel and equally spaced apart electrodes for Y-axis deflection.

10. A two-stage electron optical device for precision control of an electron beam comprising:

a. an evacuated envelope;

b. electron beam source means within said envelope;

c. target means within said envelope spaced apart from said beam source means;

d. first electron-optics means including:

1. a perforated anode positioned between said beam source means and said target means;
2. electrostatic deflection means comprising interleaved electrodes positioned adjacent the periphery of said envelope between said beam source means and said anode for simultaneous X and Y axes deflection; and
3. focus means comprising a magnetic coil about said envelope and extending along substantially the entire distance between said beam source means and said anode to provide a magnetic focusing field along the entire path of the electron beam from said beam source means to said anode;

said electrostatic deflection means and said magnetic focus coil cooperating to deflect and focus the electron beam to normal landing in the center of a preselected area defined each perforation in said anode; and e. second electron-optics means between said perforated anode and said target including:
   1. second electrostatic deflection means comprising an electrostatic yoke having interleaved electrodes thereon for simultaneous X and Y axes deflection;
   2. second magnetic focus means around said envelope and extending from said anode to said target means; and
   3. correctional means to stabilize the scan of a beam emanating from any one of said perforations comprising auxiliary electron beam means positioned adjacent said perforated anode and correctional electrodes adjacent said target to intersect said auxiliary beam, said auxiliary beam means being positioned sufficiently eccentric to said yoke to immerse said auxiliary electron beam in the magnetic focus field supplied by said second magnetic focus means without subjecting said auxiliary beam to said second deflection means.

said second deflection means, second focus means and correctional means cooperating to provide a common electron optics system for precise and common control of an electron beam emanating from any one of said perforations in said anode to insure correct and precise landing of said beam on a given segment of said target.

* * * * *

Disclaimer 3,710,176.—*Kurt Schlesinger*, Fayetteville, N.Y. ELECTRON-OPTICAL RECORDING DEVICE. Patent dated Jan. 9, 1973. Disclaimer filed, Jan. 14, 1974, by the assignee, *General Electric Company*.

Hereby disclaims the remaining term of said patent.

[*Official Gazette April 16, 1974.*]